United States Patent

Lou et al.

[11] Patent Number: 5,900,381
[45] Date of Patent: May 4, 1999

[54] OPAQUE SILICA COMPOSITION

[75] Inventors: Victor Lien Kong Lou, Niskayuna; Matthew John Curran, Schenectady, both of N.Y.; Frederic Francis Ahlgren, Highland Heights; Mohan Rajaram, Mentor, both of Ohio

[73] Assignee: General Electric Company, Schenectady, N.Y.

[21] Appl. No.: 08/918,456

[22] Filed: Aug. 26, 1997

[51] Int. Cl.[6] .............................. C03C 3/06; C03C 14/00; C04B 35/14; C04B 35/78

[52] U.S. Cl. .............................. 501/54; 501/32; 501/133; 501/154

[58] Field of Search ................... 501/54, 32, 133, 501/154, 152, 151, 126, 128, 123, 122, 103

[56] References Cited

U.S. PATENT DOCUMENTS

| | | | |
|---|---|---|---|
| 3,032,659 | 5/1962 | Bacon et al. | 501/54 |
| 4,269,757 | 5/1981 | Mine | 260/37 SB |
| 4,703,020 | 10/1987 | Nakano et al. | 501/133 |
| 4,902,326 | 2/1990 | Jarmon | 501/32 |

FOREIGN PATENT DOCUMENTS

| | | |
|---|---|---|
| 647600 | 4/1995 | European Pat. Off. . |
| 60-021827 | 2/1985 | Japan . |
| 4065328 | 3/1992 | Japan . |
| 5-170477 | 7/1993 | Japan . |
| 5-339030 | 12/1993 | Japan . |
| 6-92685 | 4/1994 | Japan . |
| 6-92986 | 4/1994 | Japan . |
| 2190092 | 11/1987 | United Kingdom . |
| 2046771 | 11/1990 | United Kingdom . |
| 9730000 | 8/1997 | WIPO . |

*Primary Examiner*—Melissa Koslow
*Attorney, Agent, or Firm*—Ernest G. Cusick; Noreen C. Johnson

[57] ABSTRACT

An opaque silica comprises silica and at least one second phase solid material. The at least one second phase solid material is essentially uniformly dispersed in the silica. A cut surface formed through the silica is free from surface defects since the at least one second phase solid material forms an opaque silica that is free from porosity.

1 Claim, 2 Drawing Sheets

OPAQUE SILICA COMPOSITION

FIELD OF THE INVENTION

The invention is related to silica compositions. In particular, the invention is related to opaque silica compositions.

BACKGROUND OF THE INVENTION

Silica, otherwise known as silicon dioxide, is a wellknown material with desirable properties. Silica has many known uses, such as but not limited to, glasses, ceramics, abrasives, semiconductors and semiconductor devices.

Several different processes can be used to produce silica. The particular process used to produce silica depends on the intended end use and desired purity of the end silica composition.

Some silica compositions possess substantial optical clarity, almost to the point of being a transparent silica composition. A transparent silica material can be made opaque if, for example the silica material contains light scattering centers, such as voids.

However, if an end use of a porous opaque silica necessitates the machining, cutting or otherwise working of the porous opaque silica, voids therein may be exposed on the machined or cut surface. Further, the silica itself may be damaged by the machining, cutting and working process, especially at the voids, where there exists a substantial possibility of cracking, fracture or other undesirable side effects due to the machining, cutting and working process.

The machining, cutting or otherwise working the porous opaque silica results in open porosity on the machined or cut surface of the porous opaque silica, where the surface most probably comprises exposed and damaged voids on the machined or cut surface of the porous opaque silica. This exposed surface with exposed and damaged voids, otherwise known as surface defects, on the machined or cut surface of the porous opaque silica is not desirable, since the exposed, damaged and impaired voids will trap and hold foreign matter. Therefore, porous opaque silica, as it is now produced, is not well suited for some applications, especially where cutting, working or machining of the porous opaque silica is needed.

Performance of porous opaque silica, resulting from machining or otherwise working the porous opaque silica, may be initially adequate for some porous opaque silica applications. For example, porous opaque silica may be initially adequate for applications, such as but not limited to, heat baffles, infra-red blockers and flanges, which are commonly used in the semi-conductor processing industries. However, during use the parts made from porous opaque material can develop undesirable characteristics as the surface of the part erodes and exposes new void surfaces.

For example, in a heat baffle application of porous opaque silica, porous opaque silica may initially perform acceptably. However, in a heat baffle application of porous opaque silica, continued and repeated acid etching, which is for cleaning and removal of impurities that have been deposited as a result of an end-user's process, of the porous opaque silica will result in a substantial amount of open porosity on an exposed surface of the porous opaque silica. The open porosity on the exposed surface of the porous opaque silica can trap undesirable debris, dirt and other foreign matter. This trapping, of course, is undesirable since the foreign matter may significantly alter properties of the porous opaque silica. Accordingly, porous opaque silica is not an ideal and desirable material for a heat baffle application.

Further, a porous opaque silica is not an ideal material for a sealing application, for example in a flange usage. Machined silica parts are often subjected to a finishing step. The finishing step comprises at least one step selected from glazing and flame polishing. Glazing comprises impinging a hot flame to the part, thereby melting a surface layer of the part. The glazed surface of the finished part should be mostly free of porosity. However, there are often at least two problems associated with achieving a glazed surface free of porosity. First, repeated etching can open up a closed pore and cause the surface to have porosity. Second, if the pores in the material are large, even a glazed surface would be "bumpy." Such a "bumpy" surface would not provide a good vacuum sealing surface. Therefore, machined porous opaque silica or finished porous opaque silica is not normally ideal for sealing purposes in a flange application.

SUMMARY OF THE INVENTION

Accordingly, it is desirable to provide an opaque silica that overcomes the above noted, and other, deficiencies in the related art.

It is also desirable to provide a opaque silica, that when machined, cut or otherwise worked, does not exhibit the undesirable effects of the related art.

It is also desirable to provide a opaque silica, where the opaque silica comprises silica and at least one second phase solid material. The at least one second phase solid material is essentially uniformly dispersed in the silica. A cut surface formed through the silica is free from surface defects since the at least one second phase solid material forms an opaque silica that is free from porosity.

DETAILED DESCRIPTION OF THE INVENTION

Figure 1:
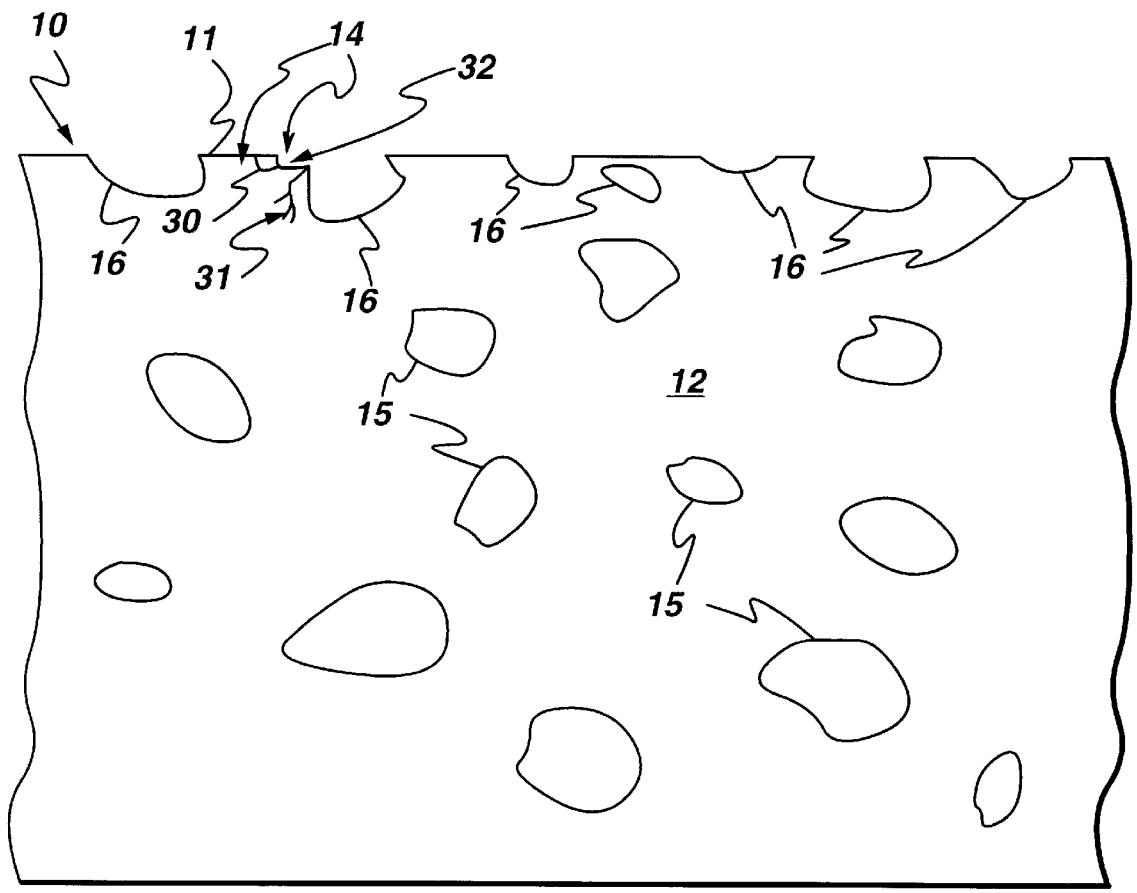
FIG. 1 is a side sectional illustration of a machined surface of opaque silica, which has been formed by incorporation of voids into silica.

FIG. 1 is a side sectional illustration of a porous opaque silica material 10. The porous opaque silica material 10 is formed in an opaque manner by incorporation of voids 15 into silica 12. A surface 11 of the porous opaque silica material 10 is cut, worked or machined for the porous opaque silica material's 10 ultimate intended end use, where cutting machining or working is needed to present the porous opaque silica material 10 in a desired form and shape.

As is illustrated in FIG. 1, the cut, worked or machined surface 11 of the porous opaque silica material 10 contains cut exposed voids 16. Further as illustrated in FIG. 1, at least one of the cut exposed voids 16 is open and exposed at the cut, worked or machined surface 11. Thus, the cut, worked or machined surface 11 is damaged, at 14, as a result of the cutting, machining or working. The damage 14 can take the form of any defect, such as but not limited to, a chip 30 that is not completely removed from the cut, worked or machined surface 11; a crack 31; and a depression or void 32. The damage 14 results since the cut exposed voids 16 do not present a continuous work area. Thus, the cutting, working or machining tool may damage the silica 12 when it encounters a void 15.

Also, the cut exposed voids 16 present a depression at which foreign matter or contaminants may accumulate. The accumulation of foreign matter or contaminants, of course, is undesirable as the foreign matter or contaminants will impair properties of the porous opaque silica material 10 and potentially contaminate any semiconductor materials that are being processed by equipment which is fabricated from this material.

Whereas opaque silicas that are formed with voids or spaces therein are undesirable, as discussed above, it is desirable to provide an opaque silica that does not contain voids or spaces. Thus, when machined, the opaque silica is not damaged, nor does it contain possible areas of contamination.

The opaque silica without voids or spaces, as embodied in the invention, and thus not possessing any porosity, is formed by incorporating at least one second phase solid material in the silica. For example, but in no way limiting of the invention, the at least one second phase solid material comprises inclusions of solid material. For example, the at least one second phase solid material comprises inclusions of an appropriate predetermined size, so as to result in an opaque silica.

Figure 2:
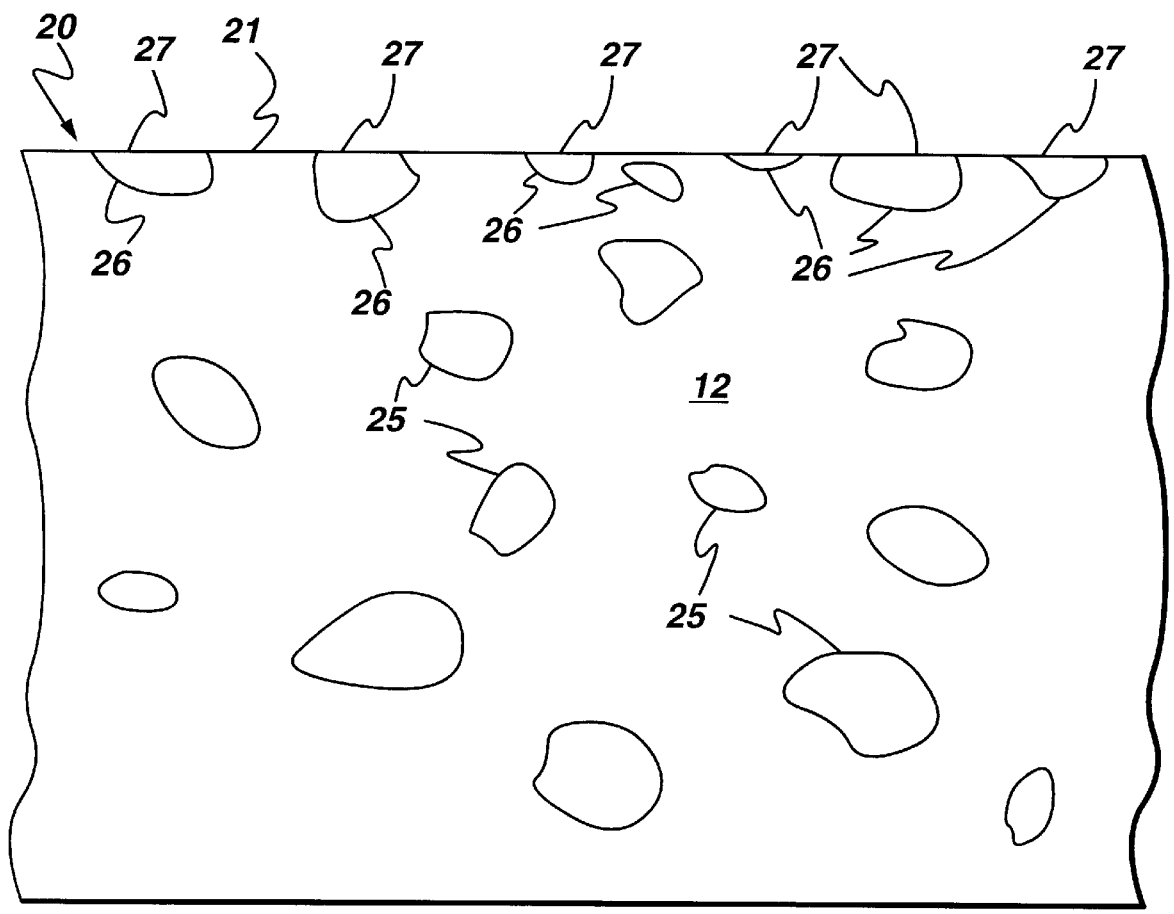
FIG. 2 is a side sectional illustration of a machined surface of opaque silica, which has been formed by incorporation of inclusions into silica.

FIG. 2 is a side sectional illustration of a machined surface of opaque silica, which has been formed by incorporation of a second phase solid materials into silica. The opaque silica material 20 is formed by incorporation of at least one second phase solid material 25 into silica 12. The incorporation of the at least one second phase solid 25 is done prior to the forming of the end silica product by, for example but not limited to, incorporating the at least one second phase solid material 25 into silica sand. The incorporation of the at least one second phase solid material 25 provides an essentially non-porous opaque silica with a generally uniform dispersion the at least one second phase solid material 25 in the silica 12. The at least one second phase solid material 25 comprises at least one type of the at least one second phase solid material 25 and can comprise a plurality of types of the at least one second phase solid material 25.

A cut, worked or machined surface 21 of the opaque silica material 20 is formed by cutting, working or otherwise machining the opaque silica material 20 for its ultimate intended use. The opaque silica 20 with the at least one second phase solid material 25 comprises a substantially homogenous blend of silica 12 and the at least one second phase solid material 25, without substantial imperfections. The cutting machining or working presents the opaque silica material 20 in a desired form and shape, and a lack of substantial imperfections presents a generally substantially planar cut, worked or machined surface 21.

As is illustrated in FIG. 2, the cut, worked or machined surface 21 of the opaque silica material 20 defines a substantially planar, generally flat cut, worked or machined surface 21. There are essentially no surface defects on the substantially planar, generally flat cut, worked or machined surface 21, contrary to the surface 11 (FIG. 1). The at least one second phase solid material 25 that is positioned at the cut, worked or machined surface 21 (hereinafter surface second phase solid materials 26) have been cut, machined or otherwise worked at a level essentially co-planar with the cut, worked or machined surface 21.

The at least one second phase solid material 25 in the silica 12 provides a constant material with second phase solid materials throughout opaque silica 20. Thus, there are no interruptions or voids during a cut and a smooth cut operation is achieved. The surface second phase solid materials 26 are cut, machined and worked with the silica 21 to define the surface 21. Because there is a lack of voids and like imperfections, the cut, worked or machined surface 21 is formed without surface defects, as the cutting, working or machining is conducted smoothly and without encountering any imperfections.

Accordingly, the surface second phase solid materials 26 at the cut, worked or machined surface 21 define a substantially planar, generally flat surface 27, that is essentially contiguous with the cut, worked or machined surface 21 of the opaque silica material 20. Thus, in direct contrast with the opaque silica porous material 10 containing cut exposed voids 16, which are open and exposed at the surface 11 as illustrated in FIG. 1, there are no exposed voids or areas in the cut, worked or machined surface 21 with the surface second phase solid materials 26 incorporated into the silica 12, as embodied by the invention.

Further, since there are no voids that will be open and exposed at the surface, there is a significantly lower chance that the cut, worked or machined surface 21 will be damaged as a result of the cutting, machining or working. Furthermore, the substantially planar, generally flat cut, worked or machined cut, worked or machined surface 21 does not present depressions at which foreign matter or contaminants may accumulate, due to the surface second phase solid materials 26 being generally co-planar with the cut, worked or machined surface 21. Thus, the substantially planar, generally flat cut, worked or machined surface 21 is essentially free of foreign matter or contaminants in its end use application, which is desirable for enhanced properties of the opaque silica 20, as embodied by the invention.

The chemistry and composition of the second phase solid materials 25 and surface second phase solid materials 26 are selected so that the second phase solid materials 25 and the surface second phase solid materials 26 are chemically and compositionally stable. For example, it is desirable for the second phase solid materials 25 and the surface second phase solid materials 26 be chemically and compositionally stable in silica manufacturing environments, such as but not limited to, vacuum; inert, active, oxidizing, reducing and hydrogen atmospheres at high temperatures. Further, the second phase solid materials 25 and the surface second phase solid materials 26 are selected to be chemically and compositionally stable in desired intended end use application environments of the opaque silica 20.

Second phase solid materials 25 and the surface second phase solid materials 26 that are included in the silica 12, as embodied in the invention, are further selected to be chemically stable in the silica 12 itself. Also, the second phase solid materials 25 and the surface second phase solid materials 26 that are included in the silica, as embodied in the invention, are chemically and compositionally benign, especially for semi-conductor processing.

Further, the second phase solid materials 25 and the surface second phase solid materials, as embodied by the invention, are selected to possess a refractive index that significantly differs from that of silica 12. For fused silica, the refractive index is about 1.45.

Any deviation from this refractive index value in second phase material, either higher or lower, would produce a desired opaque effect. The larger the deviation, the greater the desired opaque effect. With the second phase solid materials 25 and the surface second phase solid materials 26 possessing a refractive index that differs significantly from that of silica 12, scattering of light, by the opaque silica 20, as embodied by the invention, is optimized. The optimization of the refractive index is desirable.

The size of the second phase solid materials 25 and the surface second phase solid materials 26, for example inclusions, should correspond to a similar size range as a light in which the opaque silica 20, in its final end use application state, is to be employed. This selection of appropriately sized inclusions for the second phase solid materials 25 and the surface second phase solid materials 26 provides a desirable and enhanced scattering of light.

For example, but in no way limiting of the invention, for near-infrared light, the size of the second phase solid materials 25 and the surface second phase solid materials 26, as for example inclusions, should be in a range between about 1 microns to about 5 microns. Second phase solid materials 25 and the surface second phase solid materials 26, for example inclusions, that satisfy a scattering in a near-infrared light, include but are not limited to, a fibrous zirconia material and zirconia particles. However, this near-infrared example is merely descriptive and exemplary, and not meant in any way to limit the invention. Other types of second phase solid materials for the second phase solid materials 25 and the surface second phase solid materials 26 that provide desired light scattering are also within the scope of the invention.

An example of an opaque silica composition and an exemplary method of manufacture will now be described. However, these examples are not meant to limit the invention. They are merely exemplary of the many compositions and methods within the scope of the invention.

An opaque silica, as embodied by the invention, is formed by incorporating zirconia fibers into silica. Zirconia fiber has a diameter of about 5 microns. The zirconia fiber is initially mixed in a silica sand. A vacuum fusion process is conducted on the silica sand and zirconia fiber, as is known in the art. The resultant opaque silica composition comprises a dense opaque silica with second phase solid materials comprising zirconia fiber. The resultant opaque silica composition comprises an essentially uniform dispersion of zirconia fibers. The opacity of the resultant opaque silica composition can be adjusted by altering a density of the zirconia fibers that are mixed, in an essentially uniform dispersion, with the sand silica.

Other refractory materials, such as but not limited to oxides and fluorides, in particularly those that are insoluble in silica, are also within the scope of this invention for use as second phase solid materials that can be mixed with silica to provide an opaque silica. For example, refractory oxides are within the scope of the invention, as second phase solid materials. These refractory oxides comprise rare earth oxides, for example such as at least one of yttrium oxide, lanthanide oxides, actinide oxides and hafnium oxide (hafnia) and combinations of these materials. Further, refractory materials, within the scope of the invention comprise at least one material from the group of magnesium oxide, titanium oxides, calcium oxide, aluminum oxide, and calcium fluoride. Some second phase materials may cause some coloration, which can be undesirable. Examples of second phase materials that do not cause coloration include, zirconia oxide, hafnium oxide (hafnia), and yttrium oxide.

Further, while the above example described oxide in the form of fibers, this is only one of the several forms of the second phase solid materials to be mixed with silica to provide an opaque, as embodied by the invention. The oxide that comprises second phase solid materials to be mixed with silica to provide an opaque silica can be provided in any suitable form. The suitable forms include granular materials, fibrous materials, and combinations of both granular and fibrous materials.

Further, soluble oxides, as second phase solid materials, may react differently with the silica 12. Thus, the soluble oxides, as second phase solid materials can provide various degrees of opaque silica. For example, a dispersion of a dissolved oxide will result in optical inhomogeneity in silica. This optical inhomogeneity will result in the silica being generally opaque.

The following are example of opaque silica is prepared in accordance with the invention. This is merely an example and not meant to limit the invention in any manner.

An opaque silica, as embodied by the invention, about 0.5% by weight and about 1.0% by weight of zirconia fiber is mixed with a sand silica. A fusion process in a vacuum is conducted on the sand silica and zirconia fiber, as is known in the art. The resultant opaque silica is substantially free of any internal porosity. Further, the resultant opaque silica bonds well to other materials, such as for example, the resultant opaque silica bonds well to transparent undoped silica.

The transmission through an approximately 3 mm thick piece of a 1.0% by weight of zirconia opaque silica material, prepared as discussed above, is about 1.2%, at light having a frequency of about 4000 cm$^{-1}$. Further, the resultant opaque silica, when machined, cut or otherwise worked, possesses a substantially void-free cut, worked or machined surface, where the cut, worked or machined surface can be polished to a fine finish, which is substantially free of surface defects resulting from voids.

Other resultant opaque silica compositions, as embodied by the invention, were prepared with about 1% by weight and about 2% by weight zirconia particles, with the process as described above. The transmission and surface traits of the opaque silica on a the cut, worked or machined surface are substantially similar to the results discussed above.

While the embodiments described herein are preferred, it will be appreciated from the specification that various combinations of elements, variations or improvements therein may be made by those skilled in the art that are within the scope of the invention.

What is claimed is:

1. An opaque silica comprising:

silica; and at least one second phase solid material, the at least one second phase solid material being essentially uniformly dispersed in the silica, wherein the at least one second phase solid material comprises hafnia particles.

* * * * *